United States Patent [19]
Retat

[11] Patent Number: 5,098,040
[45] Date of Patent: Mar. 24, 1992

[54] MICRO-G NEUTRAL PLATFORM FOR SPACE TRAVEL MISSIONS

[75] Inventor: Ingo Retat, Bremen, Fed. Rep. of Germany

[73] Assignee: ERNO Raumfahrttechnik GmbH, Bremen, Fed. Rep. of Germany

[21] Appl. No.: 489,459

[22] Filed: Mar. 6, 1990

[30] Foreign Application Priority Data

Mar. 15, 1989 [DE] Fed. Rep. of Germany ....... 3908376

[51] Int. Cl.$^5$ .............................................. P64G 1/28
[52] U.S. Cl. ................................. 244/158 R; 272/72
[58] Field of Search .................. 244/1 R, 158 R, 159, 244/118.5, 117 R; 248/638; 272/69, 70, 67, 68, 72, 93, 134, 135, 136

[56] References Cited

U.S. PATENT DOCUMENTS

| | | | |
|---|---|---|---|
| 2,714,507 | 8/1955 | Goodrich | 272/72 |
| 4,040,590 | 8/1977 | Baratoff | 248/638 |
| 4,043,524 | 8/1977 | Dreyer et al. | 244/158 R |
| 4,238,104 | 12/1980 | Hamilton | 248/638 |
| 4,725,057 | 2/1988 | Shifferaw | 272/135 |
| 4,892,273 | 1/1990 | Fedor | 244/158 R |

Primary Examiner—Jesus D. Sotelo
Assistant Examiner—Stephen P. Avila
Attorney, Agent, or Firm—Toren, McGeady & Associates

[57] ABSTRACT

In a device for the support of a vibration exciting apparatus in a spacecraft subjected to gas pressure under weightlessness or microgravitational conditions, especially an apparatus for physical training of a astronaut, a platform for the fastening of the apparatus is provided. For elimination of possible effects upon micro-g sensitive experiments, the platform's position or attitude in the spacecraft can be positioned so that the spacecraft is decoupled from disturbances. For the attitude control, either an aerodynamic stabilization or an actively regulatable linear structural connection with spring and damper effects is provided wherein the energy for the attitude control is produced from the conversion of mechanical energy of the vibration generating apparatus or the training activity of the astronaut.

16 Claims, 2 Drawing Sheets

MICRO-G NEUTRAL PLATFORM FOR SPACE TRAVEL MISSIONS

BACKGROUND OF THE INVENTION

The invention is directed to an apparatus for the support of at least one vibration generating or exciting device in a spacecraft subjected to gas pressure in zero gravity or microgravitational conditions, especially a device for the physical training of astronauts.

The performance of micro-g sensitive experiments in space is one of the main tasks of astronauts in the European Space Travel Center over the course of the next several decades. Experiments in weightlessness are to be performed, for instance, in the European Attached Pressurized Module of the International Space Station or in the Man Tended Free Flyer. These experiments assume a nearly acceleration-free and force-free environment. For the International Space Station, one strives toward a maximum DC acceleration level of $10^{-5}$ g $= 10^{-4}$ m/$^2$. With an overall weight of the station of approximately 100 tons, a force of only maximally 10N is permitted to be exerted on the station if this station is assumed to be a rigid body. The shocks being exerted by vibration exciting apparatus, for instance centrifuges and the like, as well as normally during intensive training of an astronaut upon the space station and thus also upon the highly sensitive micro-g experiments, are however considerably higher. A damping-type suspension of the experiments, which reduces the effect of such shock effects, is impossible because of space problems (dampening travel) or is highly problematic.

Intensive training of astronauts in space is unavoidable in order to counter problems arising during missions of long duration such as a loss of minerals in the bones, slackening of the heart circulation system and, last but not least, psychic demotivation. It has become known from Russian space flights that cosmonauts who train especially readily and intensively stand up well under long duration mission conditions. It is therefore imperative for the success of such missions of long duration to maintain the state of health of the astronauts by regular use of suitable training apparatus. Thus the creation of a training device is particularly required which permits the intensive training of the astronauts without transmitting the disturbances arising therein to the spacecraft.

SUMMARY OF THE INVENTION

Thus, the invention has as its principal object an apparatus of the above-mentioned type that avoids influencing or affecting micro-g sensitive experiments.

In accordance with one aspect of the invention, this object is achieved by providing a platform to receive and support the vibration-generating device or apparatus, and to provide means to support or position the platform within the spacecraft such that vibrations generated by the device are not transmitted to the spacecraft. With the transmittal shocks and vibrations to the spacecraft effectively and reliably prevented, micro-g sensitive experiments can be performed without disturbance at the same time that astronauts train on the platform. The vibration generating device, especially when a training device, is advantageously regulatable as far as its position in the spacecraft is concerned in such a way that no vibrations are transferred to the spacecraft.

For the vibration decoupling position or attitude regulation of the platform, either an isolating type of suspension or alternatively a completely connection-free positioning of the platform at a suitable place is provided in a portion of the manned/manable orbital element (for instance, the habitation module or interconnecting cube of the U.S. Space Station "Freedom") subject to pressure. Completely connection-free positioning of the platform or its vibrational decoupling attitude regulation can be obtained according to a preferred embodiment of the invention by aerodynamic stabilization of the platform by means of cold gas position regulation nozzles which can be actuated by sensors. Preferably, the required cold gas is aspirated from the surrounding spacecraft atmosphere through suction apertures respectively arranged to be symmetrically opposite each other, the gas is compressed to the required working pressure, and is then temporarily stored in a compressed gas accumulator. The cold gas is thus drawn from the module atmosphere so as to be advantageously free of any force effects (because of the symmetrical aspiration) and is compressed by a compressor, wherein the pressures utilized are naturally considerably lower than in satellite cold or super cold gas regulation. Thus, the stabilizing forces are introduced into the structure not just at points, but in a favorable wide area-shaped manner. Apart from this, position or attitude regulation impulses are advantageously conducted by the air in a damped way, so that a basically soft type of damping is obtained.

The required actuation of the position regulation nozzles for the aerodynamic stabilization can be performed advantageously in a known way such that all nozzles are opened when the platform is in a neutral condition and specific nozzles are closed for producing platform positional regulation impulses. The sensors provided for stabilization actuation are preferably optical sensors which respond to optical markers in the module for ideal maintenance of the apparatus suspended in the center of the spacecraft module.

Alternatively, an isolating type of suspension is provided according to a preferred embodiment of the invention for the vibration decoupling position regulation. This suspension consists of actively regulatable linear structural connections with spring and damping effects, wherein the spring characteristic is changeable between being very soft in case of optimum spacing of the apparatus holding the platform from the inner wall of the spacecraft module, up to very hard in the case of close approach of the apparatus to the inner wall. Thus, an infinitely soft and slightly dampened suspension is advantageously achieved when the apparatus is located in the center of the module, the suspension or damping becoming harder if the apparatus approaches the module walls (or racks). Thus, advantageously, no forces are introduced into the module, which forces are caused by shock or pendular movements of the apparatus, as long as there exists no danger of contact. The suspension advantageously becomes stiffer only when the danger of contact with racks or other equipment arises. Preferably, the linear structural connections are respectively laid out as linear motors which, depending on the type of actuation, assume spring and/or dampening functions.

According to an additional advantageous embodiment of the invention, an optical data link arrangement is provided between the platform and the spacecraft which, in case of necessity, can be complemented by voice-video communication between an astronaut in training and persons on the ground or in other spacecraft locations. This enables in a favorable manner, for instance, remote monitoring of the astronaut during the exercises or of the vibration generating device on the platform, for instance, monitoring from the ground, without a physical connection to the device.

According to a preferred additional feature of the apparatus of the invention, at least the energy required for the positional regulation of the apparatus emanates from an electromechanical or pneumatomechanical conversion of the vibration energy or the mechanical energy produced by the astronaut while undergoing training on the training apparatus. Thus, a completely self sufficient apparatus is created in an advantageous manner which need not depend upon the resources of the spacecraft. The entire electrical energy for the system component consumers, such as compressed air generator, electronics, sensors infrared sender/receiver of the optical data link arrangement, etc. can be produced by the vibrational energy of the apparatus located on the platform or the training movements of the astronaut.

One embodiment in accordance with this feature first provides conversion of mechanical energy into pneumatic energy from which the required electrical energy share can be obtained. Alternatively, an advantageous embodiment provides a direct conversion of the vibration energy or the mechanical energy generated by the astronaut when training on a training device by means of aggregates driveable independently of each other into the required electrical energy and possibly pneumatic energy. This electromechanical conversion occurs preferably by means of counter-rotating generators.

It is furthermore of advantage, in order to facilitate the initialization of support, to provide at least one energy accumulator chargeable with excess generated energy; in this connection it is furthermore preferred to conduct such excess energy from the conversion of the vibration energy or from the mechanical energy generated by the astronauts in the course of training, which can no longer be stored, in the form of electrical energy to electrical heating resistances for yielding heat to the surrounding atmosphere; the electrical heater resistances are preferably arranged at the aerodynamic positional stabilization in the cold gas flow upstream of the cold gas nozzles. These features permit converting the mechanical power or output generated during training of the astronaut, to the extent that it is not required for maintaining the air flow in the position control nozzles and for the functioning of other electrical consumers of the device, in an advantageous manner through an electrical heater resistance into heat, and this resistance can transfer the heat particularly efficiently via the suction airflow of the position or attitude control means.

The mechanical energy developed in the course of astronaut training can also be converted directly in a mechanical, pneumatic or electromechanical manner according to previously described embodiments of the invention and can be extended even further. Thus, in the initial conversion of mechanical into pneumatic energy, the mechanical energy can be converted into a pressure increase in an air pressure container or accumulator by means of a mechanically connected compressor.

The desired change of the characteristic of a force-travel program during astronaut training can be accomplished by a regulatable or controllable throttle valve between the compressor and the compressed gas container or accumulator. The throttle valve can blow the air out symmetrically and thus devoid of force or momentum. Already a portion of the excess energy is converted into heat, which was stored directly in the compressed gas. The required electrical energy is generated in this embodiment of the device by a compressed gas turbine-generator aggregate located downstream of the compressed gas container or accumulator. The remaining share of excess energy can either be reduced indirectly by an electrical method, e.g., a generator heater resistance in the air flow of the attitude control, or directly by an increase of the air flow in the attitude control nozzles.

In the initial conversion of the mechanical energy into electrical energy, a direct conversion into electrical energy is obtained in an advantageous manner by means of one or several mechanically interconnected generators. By the preferred arrangement of counter-rotating generators, it is advantageously achieved that their overall rotational impulse is always exactly equal to zero. The converted electrical energy then serves for attitude control, especially for driving of the compressor/blower and the required electronics, and, to the extent that it is not required, can be temporarily stored in a battery (NiCd). Excess energy which cannot be received by the battery serving as a buffer is advantageously directly converted into heat by the heater resistances arranged in the air flow of the attitude control system. These resistances can be varied in the device or from the ground in order to, for instance, change the state of charge of the battery or the load on the astronaut. It is preferred that the initialization of the support system is delivered or supplied by initial energy from at least one energy storage accumulator, especially the battery.

Naturally, also other energy conversions are of importance within the framework of the invention, for making use of the energy produced by the vibration generating apparatus or by the training activity of an astronaut, for instance, conversion into heat energy or a combination of the possibilities previously described.

In order to guarantee safe dissipation of the heat and of the micro-g conditions without convection flows arising, each resistance can be actively cooled by a blower. In case of aerodynamic stabilization, the existing blower can advantageously be used for this purpose. Special adaptation of the nozzle actuation is, however, required for the cooling task to the extent that in the neutral state, meaning in an apparatus position not requiring attitude control, air must be blown out of all nozzles in order to assure optimum cooling of the resistances installed in the central supply flow region of the nozzles. For attitude control tasks, then only the appropriate nozzles are closed.

According to a further feature of the invention, the training aggregate fastened to the platform is designed as a remotely controllable rowing machine with strap-in arrangements for the astronaut. The device can preferably be folded when not in use and stowed without using much space.

SUMMARY OF DRAWINGS

The invention will now be described with particularity for a preferred embodiment example with reference to the accompanying drawings, wherein.

DETAILED DESCRIPTION OF PREFERRED EMBODIMENTS

Figure 1:
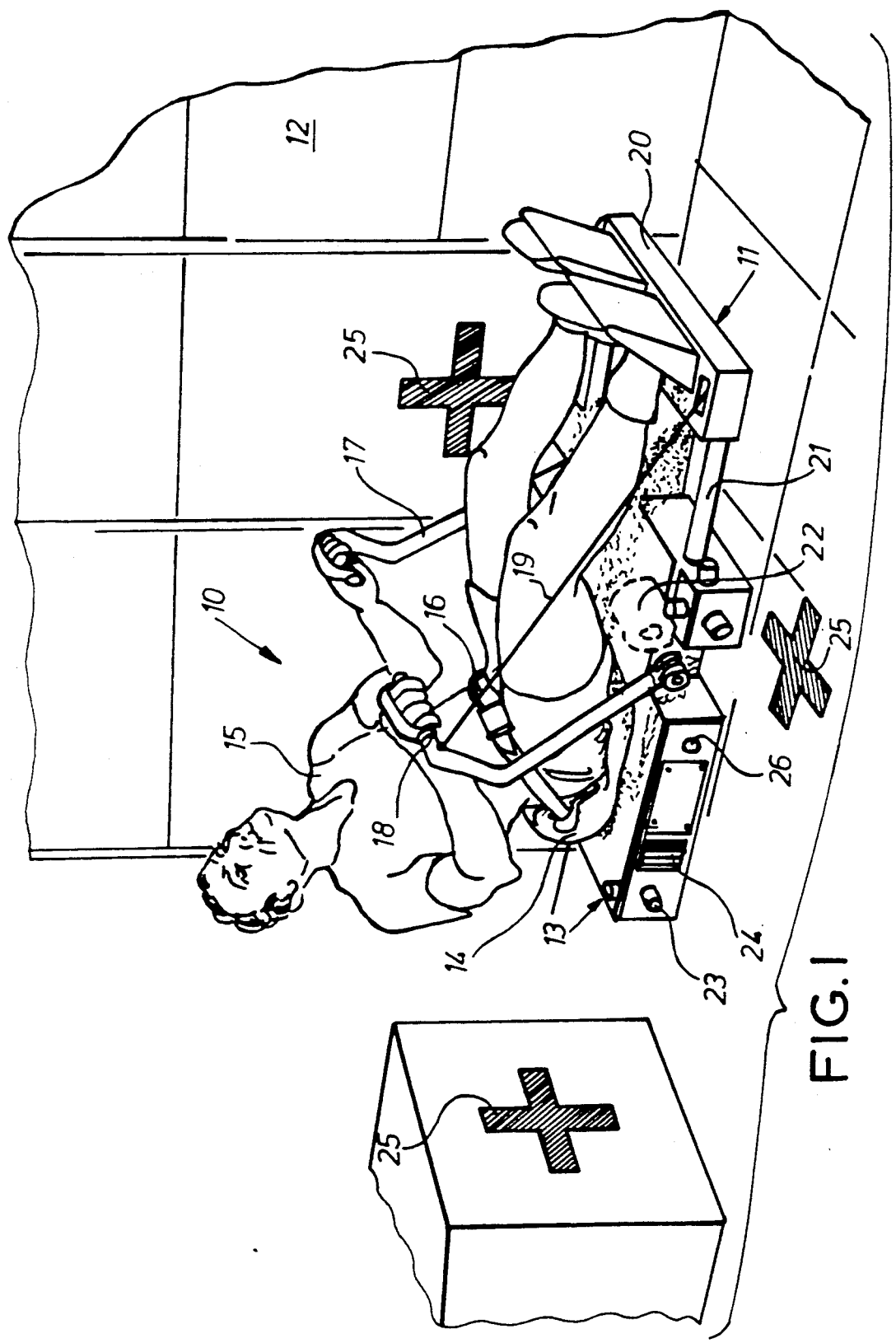
FIG. 1 is a perspective view of one form of apparatus according to the invention with an astronaut in exercising position.

FIG. 1 shows diagrammatically and schematically one form of an apparatus 10 for the support of a training device 11 for the physical training of astronauts, wherein the apparatus 10 is located and shown in its attitude stabilized position in a spacecraft module while subjected to gas pressure under weightlessness or microgravitional condition.

The apparatus 10 comprises a platform 13 with a training device 11 being fastened thereon. A seat shell 14 is fastened on the platform 13, on which sits an astronaut 15 strapped in by means of a strap-in device 16. The training apparatus 11 is designed in the example shown as a rowing machine with two pivoting arms 17, whose upper end is respectively bent over to form handles 18. A cable 19 is respectively fastened in the region of the handles 18; only the front cable 19 is shown. The cables 19 are led in the region of foot supports 20 around respectively one reversing roller (not shown here) and then they extend through a telescopic cable sheath 21 up to counter-rotating generators 22. One generator 22 is shown next to the astronaut's right leg. The second generator would be symmetrically mounted next to his left leg. The cables drive the generators but in opposite rotational directions. The mechanical energy supplied by the astronaut 15 when pulling on the handles 18 and when pressing his feet against the foot supports 20 and thus extending the telescopic extension device 21 is thus converted as mechanical work directly into electrical energy. As the astronaut's body goes backwards, his legs go forward, and vice-versa.

The force-travel training programs can be adjustable individually possibly also by teleprogramming for the individual astronaut 15 as well as for the time period during which he is subjected to micro-g conditions. The counter movements, meaning the extension of the legs as the upper body reclines, has the advantage that the position of the center of gravity of the astronaut 15 with respect to the device 10 undergoes only very little change and because of this, the entire system remains still in space (if one ignores small disturbances). The impulse of the device 10 as well as that of the astronaut 15 are thus nearly identically zero.

The platform 13 must DC-wise (directional control or device control) only compensate disturbances caused by drag (externally of the module). The two counter-rotating generators 22 have a total rotational impulse identically equal to zero and thus do not exert any moment on the device. With the rotational impulse and the impulse approximately identically zero, the device 10 is thus free of force and moment effects and remains nearly still suspended in space. In addition, exercisers similar to those during weight lifting can be performed with the rowing machine 11. The device 10 can also be equipped with an ergometer (not shown here) wherein asymmetrically distributed weights at the pedals and counter-rotating masses are required for inertial mass compensation. Other training possibilities, such as treadmills, dumbbell exercises by means of cable pulley, etc. are also possible.

Figure 2:
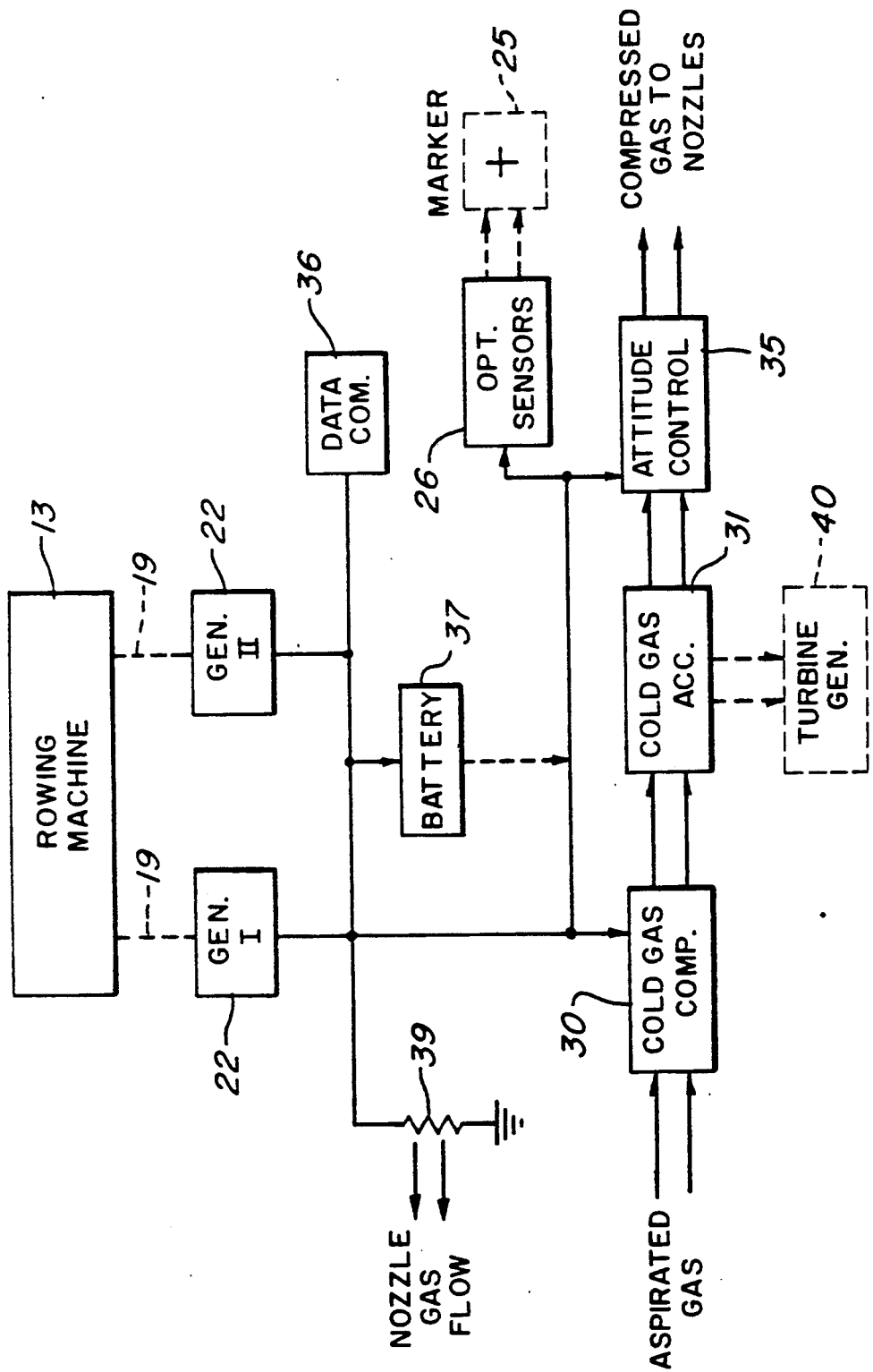
FIG. 2 is a schematic block diagram showing the various components of an apparatus according to the invention.

The platform 13 has an approximately rectangular housing, in which cold gas nozzles 23 are arranged in such quantities in the corner regions that three axis attitude stabilization is made possible in a known manner. The cold gas required by the cold gas nozzles 23 is aspirated from the surrounding atmosphere through aspiration apertures 24 respectively located symmetrically opposite each other; one is shown in FIG. 1; at least a second one would be symmetrically located on the opposite side of the platform. The cold gas is compressed 30 (FIG. 2) in a conventional manner up to the required working pressure and is temporarily stored in a conventional cold gas accumulator 31. The cold gas nozzles 23 are actuated by optical sensors 26 responding to optical markers 25 for attitude or position regulation or control by way of a conventional control system 35. The markers 25 are arranged in such a way on the inner walls of the spacecraft module 12 that the device can be positionally stabilized approximately in the center of the module.

Furthermore, the platform 13 comprises conventional electronics (not shown) and an optical data transmission arrangement 36 of which only the optical sensors 26 are shown in FIG. 1. Typically, one sensor would be associated with each marker 25. The work performed by the astronaut 15 is utilized for current supply to the control electronics, the attitude control 35 and the data transmission means 36. Electrical energy produced in the generators 22 is temporarily stored in batteries 37.

The optical data transmission system 36 is conventional and serves for medical monitoring of the astronaut 15 during his training, which data transmission device preferably operates in the infrared region. This eliminates EMC (electromagnetic clutter) problems. This data transmission device can also be used for programming the training device from the ground and to thus adapt it to the condition of the astronaut 15. A non-depicted optical voice connection can constitute a further interface.

Essentially three interfaces exist in connection with the spacecraft module 12. In the case of aerodynamic stabilization, there exists no hardware connection while, with the alternative of active suspension with direct connection, retention points are required in the module structure. An additional interface consists of the optical reference points or markers 25 in the module 12 for positional control of the device 10. For this purpose, one could use passive markers 25 which are simply glued on. Alternatively, according to a preferred embodiment, active elements as for instance light emitting diodes can be provided which can also be battery operated, so that only one mechanical interface (gluing or bonding) exists. The third interface comprises the optical sensors 26 for data transmission wherein coupling with the DHS is provided. The sensors 26 can also preferably be arranged on the ground.

As mentioned earlier, excess power generated by the exercising astronaut can be dissipated usefully by directing it to electrical resistance heaters 39, preferably located upstream of the nozzle air flow, so that as the nozzles are actuated to stabilize the platform the ejected gas is simultaneously heated. In addition, FIG. 2 also shows a turbine generator 40 that could be connected to the compressed gas storage tank 31 and operated by the compressed gas when desired to generate further electrical energy if required.

Operation of the device is as follows. Prior to the start of training, the device can be arrested or locked at the base of the module 12. The astronaut 15 straps himself into the seat 14 by means of the strap 16 and then releases any arresting device of the apparatus 10. The apparatus 10 thereupon manoeuvres itself with the help of the energy stored in the batteries with due regard to the micro-g requirements of the spacecraft into the center of the module 12, prior to the actual training being started. During this process, the platform 13 orients itself by the optical markers 25.

During training, the astronaut 15 is constantly monitored from the ground and the state of his stress can be adapted to his health condition by teleprogramming the device. Since this time counts as a free time period for the astronaut, one can additionally provide a pleasant environment by additional measures. Among these are music, possibly voice and video contacts with the ground monitors, and possibly also the suggestion of an earth environment by means of visual projection. Since several hours of training are required each day for longer missions, a motivating atmosphere is to be seen as being of special significance.

After termination of training, any possible residual vibrations of the device are slowly damped and the device manoeuvres itself into its position of rest and back to the base of the module 12, whereupon the astronaut then locks or immobilizes the device and dismounts. In case this is not immediately followed by training of another astronaut, the training device 11 can be folded in any convenient space-saving manner.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. In a spacecraft subjected to gas pressure under conditions of weightlessness or microgravity, apparatus for supporting at least one vibration-generating device, comprising:
   a platform for receiving and supporting the vibration-generating device,
   means for positioning the platform within the spacecraft in such manner as to essentially decouple the platform from the spacecraft so that vibrations generated by the device are not transmitted to the spacecraft, wherein the positioning means comprises means for aerodynamically stabilizing the platform within the spacecraft, and wherein said stabilizing means requires operating power, and the platform comprises means for generating the operating power for the stabilizing means.

2. Apparatus for physical training of astronauts within a spacecraft which must remain substantially free of disturbances and under conditions of weightlessness or microgravity, comprising:
   a platform,
   an exercising device for an astronaut mounted on the platform,
   means on the platform for aerodynamically stabilizing it within the spacecraft such that vibrations generated by an exercising astronaut on the device are not transmitted to the spacecraft,
   means connected to the exercising device for generating electrical power when operated by the astronaut, and
   means for connecting the generated electrical power to the stabilizing means for operating the latter.

3. The combination of claim 2, wherein the exercising device is a rowing machine comprising arm members and leg members which during operation are displaceable in opposite directions.

4. Apparatus for the support of at least one vibration generating device in a spacecraft subjected to gas pressure under conditions of weightlessness or microgravity, said device comprising an apparatus for physical training of astronauts, characterized by a platform for the attachment of the device, and means for supporting the platform within the spacecraft in such manner that disturbances on the platform are decoupled from the spacecraft, wherein said platform support means comprise means for aerodynamic stabilization of the platform by means of cold gas positional control nozzles in response to changes in its position.

5. Apparatus according to claim 4, further comprising optical sensors for generating signals for actuating the control nozzles.

6. Apparatus according to claim 4, further comprising suction aspirators symmetrically located about the platform for aspirating spacecraft gas, means connected to the aspirators for compressing the aspirated gas, a gas accumulator connected to the compressing means for storing compressed gas, and means for supplying the stored gas to the control nozzles.

7. Apparatus according to claim 4, further comprising means for generating the entire energy required by the platform from the conversion of the mechanical energy produced by the astronaut during operation of the training device.

8. Apparatus according to claim 7, wherein the generating means comprises means for converting mechanical energy into pneumatic energy, and means for converting pneumatic energy into electrical energy.

9. Apparatus according to claim 7, wherein the generating means comprises means for the direct conversion of the mechanical energy produced by the astronaut into pneumatic and electrical energy by means of aggregates which can be driven separately from each other.

10. Apparatus according to claim 9, wherein the aggregates comprise counter-rotating generators for conversion of the mechanical energy produced by the astronaut into electrical energy.

11. Apparatus according to claim 10, further comprising at least one energy storage means for initializing the positioning of the platform and means for charging the storage means by excess energy.

12. Apparatus according to claim 7, further comprising electrical heater resistances for furnishing heat to the surrounding atmosphere from excess energy from the conversion of the mechanical energy produced by the astronaut.

13. Apparatus according to claim 4, wherein the training apparatus comprises a remotely-controllable rowing machine with a strap-in device for the astronaut.

14. Apparatus for the support of at least one vibration generating device in a spacecraft subjected to gas pressure under conditions of weightlessness or microgravity, said device comprising an apparatus for physical training of astronauts, characterized by a platform for the attachment of the device, and means for supporting the platform within the spacecraft in such manner that disturbances on the platform are decoupled from the spacecraft, further comprising optical data transmission means between the platform and the spacecraft.

15. Apparatus for the support of at least one vibration generating device in a spacecraft subjected to gas pressure under conditions of weightlessness or microgravity, said device comprising an apparatus for physical training of astronauts, characterized by a platform for the attachment of the device, and means for supporting the platform within the spacecraft in such manner that disturbances on the platform are decoupled from the spacecraft, further comprising optical markers on the spacecraft, and optical sensors cooperating with the optical markers for providing positional control for the platform supporting means.

16. Apparatus according to claim 15, wherein the optical markers are formed by active elements.

* * * * *